United States Patent [19]

Kline

[11] Patent Number: 4,928,171
[45] Date of Patent: May 22, 1990

[54] VIDEO ASSIST SYSTEM FOR MOTION-PICTURE CAMERA

[75] Inventor: Donald Kline, Canoga Park, Calif.

[73] Assignee: Panavision, Inc., Tarzana, Calif.

[21] Appl. No.: 115,145

[22] Filed: Oct. 30, 1987

[51] Int. Cl.[5] .......................... H04N 3/36; H04N 7/18
[52] U.S. Cl. ...................................... 358/97; 358/214; 358/215
[58] Field of Search ................. 358/97, 214, 140, 311, 358/185, 244, 244.1, 215, 216, 228; 352/131

[56] References Cited

U.S. PATENT DOCUMENTS

| | | | |
|---|---|---|---|
| 3,490,835 | 1/1970 | Nemeth et al. | 358/228 |
| 3,715,486 | 2/1973 | Wright et al. | 358/214 |
| 3,796,828 | 3/1974 | Barboni et al. | 358/215 |
| 4,171,529 | 12/1979 | Silberberg et al. | 358/209 |
| 4,301,476 | 11/1981 | Keller et al. | 358/228 |
| 4,357,624 | 11/1982 | Greenberg | 358/311 |
| 4,370,856 | 1/1982 | Poetsch | 358/215 X |
| 4,418,360 | 11/1983 | Glasgow | 358/214 X |
| 4,633,293 | 12/1986 | Powers | 358/160 X |
| 4,660,091 | 4/1987 | Nutting | 358/228 X |

FOREIGN PATENT DOCUMENTS

| | | |
|---|---|---|
| 0162311 | of 0000 | European Pat. Off. |
| 3437208 | 5/1986 | Fed. Rep. of Germany |
| 3437210 | 5/1986 | Fed. Rep. of Germany |
| 0737225 | 9/1955 | United Kingdom |
| 1139580 | 1/1969 | United Kingdom |
| 1377928 | 12/1974 | United Kingdom |
| 1528909 | 10/1978 | United Kingdom |
| 1567660 | 5/1980 | United Kingdom |

*Primary Examiner*—James J. Groody
*Assistant Examiner*—Victor R. Kostak
*Attorney, Agent, or Firm*—Lyon & Lyon

[57] ABSTRACT

A video assist system operates in parallel with a motion-picture camera by recording and scanning periodic frames of the motion-picture image. Each recorded frame is transferred to intermediate storage where data from that frame may be processed at a rate which is independent of the motion-picture capture rate. Data for each recorded frame is translated into an intermediate signal format in which each line of a television ("TV") image signal is transmitted at a standard TV signal rate, but in which an entire frame is transmitted at the motion-picture capture rate. The intermediate signal format is presented to a frame buffer which allows conversion to a standard TV signal format.

37 Claims, 5 Drawing Sheets

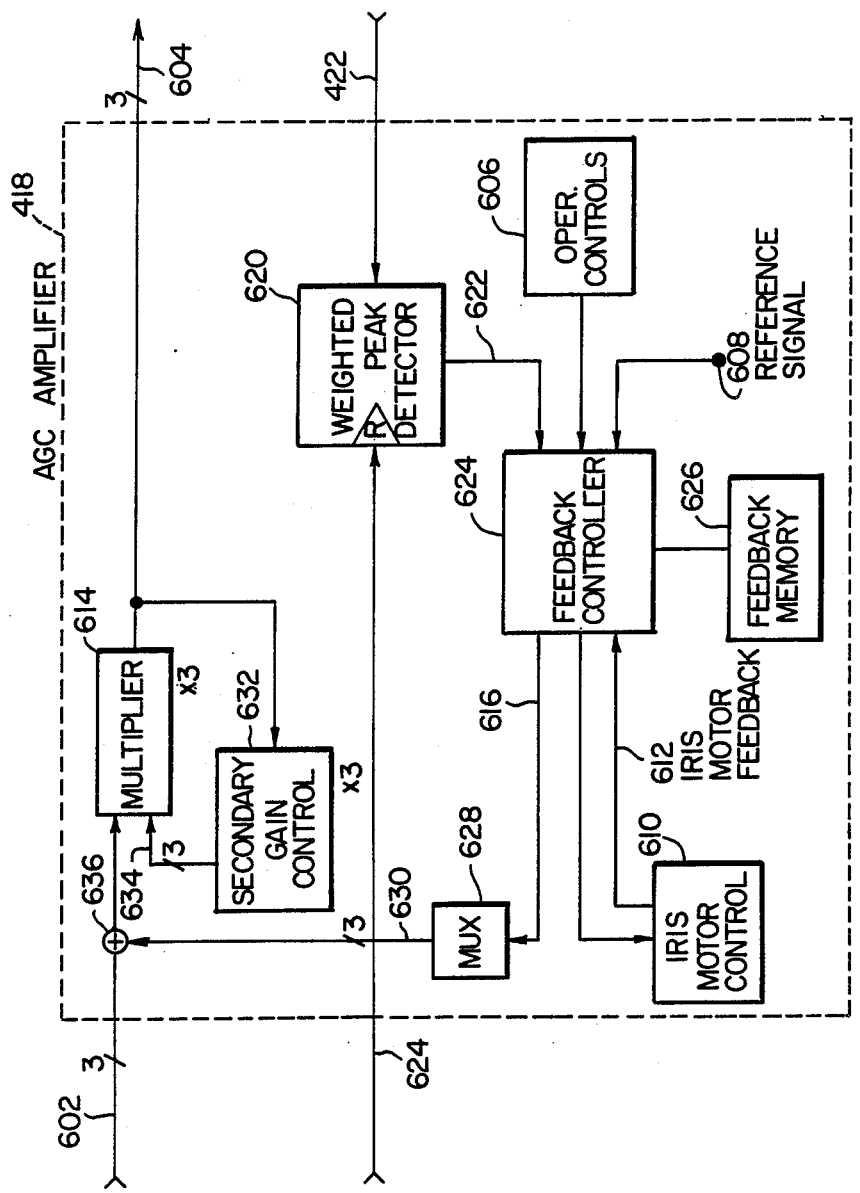

VIDEO ASSIST SYSTEM FOR MOTION-PICTURE CAMERA

BACKGROUND OF THE INVENTION

1. Field of the Invention

This invention relates to the field of motion-picture and television video. More specifically, without limiting the generality of the invention, this invention relates to the field of video assist systems for motion-picture cameras.

2. Description of Related Art

In the course of making a motion picture, it is often advantageous to duplicate the image which is available to the motion-picture camera operator (the "operator") and present this image simultaneously to another person. The operator controls the placement and operation of the motion-picture camera, and is generally the only person who sees the image captured by the camera before that image is actually developed from film. If the operator fails to notice extraneous elements in the image, or fails to properly position the camera, the image will be of poor quality and the film may have to be re-shot.

A "video assist" camera duplicates the image which is available to the operator, typically by use of a television ("TV") camera. The use of a TV camera is advantageous because it allows a signal representing the TV image (a "TV signal") to be electronically routed to remote points, and to be electronically manipulated by well known TV techniques, without much additional work. Coordination of the TV image with that of the motion-picture image has been subject to the problem that the TV image will tend to flicker, because the rate at which the motion-picture camera captures its image is not synchronized with the rate at which the TV image is displayed.

A motion-picture camera typically captures its image by exposing film at a particular fixed rate (its "capture rate"); in many motion-picture films this rate is about 24 frames/sec. In motion-picture cameras using a rotating mirror or reflex principle, the film and viewfinder images are blanked out alternately at the same 24 frame/sec capture rate. A TV camera operates with a capture rate which may be completely different, and is typically 50 or 60 frames/sec in common TV systems. (As used herein, "frame" means a single two-dimensional display image, and specifically means a single TV "field"; a TV "frame" comprising a pair of interlaced fields is referred to herein as a "frame pair".) Because these rates are different, a TV image which is captured at a motion-picture capture rate will tend to exhibit visual "flicker" at the fundamental and beat frequencies.

SUMMARY OF THE INVENTION

A video assist system operates in parallel with a motion-picture camera by recording and scanning periodic frames of the motion-picture image. Each recorded frame is transferred to intermediate storage where data from that frame may be processed at a rate which is independent of the motion-picture capture rate.

Without limiting the generality of the invention, data for each recorded frame is translated into an intermediate signal format in which each line of a television ("TV") signal is transmitted substantially at a standard TV signal rate, but in which an entire frame is transmitted substantially at the motion-picture capture rate. The intermediate signal format is transmitted to a frame buffer for storing an entire field. A TV image is then retrieved from the frame buffer in a standard TV signal format.

Without limiting the generality of the invention, the frame buffer may be used to record images and to redisplay recorded images in conjunction with present images, so as to compare images and to arrange persons or things to conform to an earlier arrangement.

Without limiting the generality of the invention, a line buffer may record an entire horizontal scan line of data for each recorded frame. The line buffer assures that discontinuities do not appear in the video image recorded in and retrieved from the frame buffer. A mirror reversal may be undone by reading the line buffer in reverse from the order it was stored. The line buffer may also be used to provide time base correction for a relatively unsynchronized external video signal.

BRIEF DESCRIPTION OF THE DRAWINGS

FIG. 6 shows a block diagram of the automatic gain control amplifier.

DESCRIPTION OF THE PREFERRED EMBODIMENT

Figure 1:
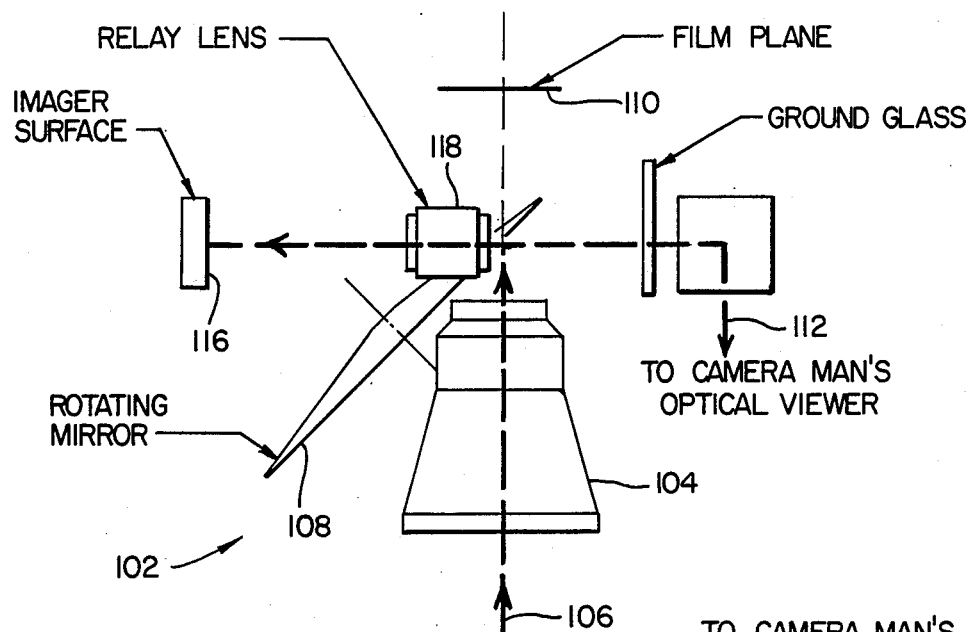
FIG. 1 is a top plan view of an illustration of a motion-picture camera incorporating a video assist system.
Figure 2:
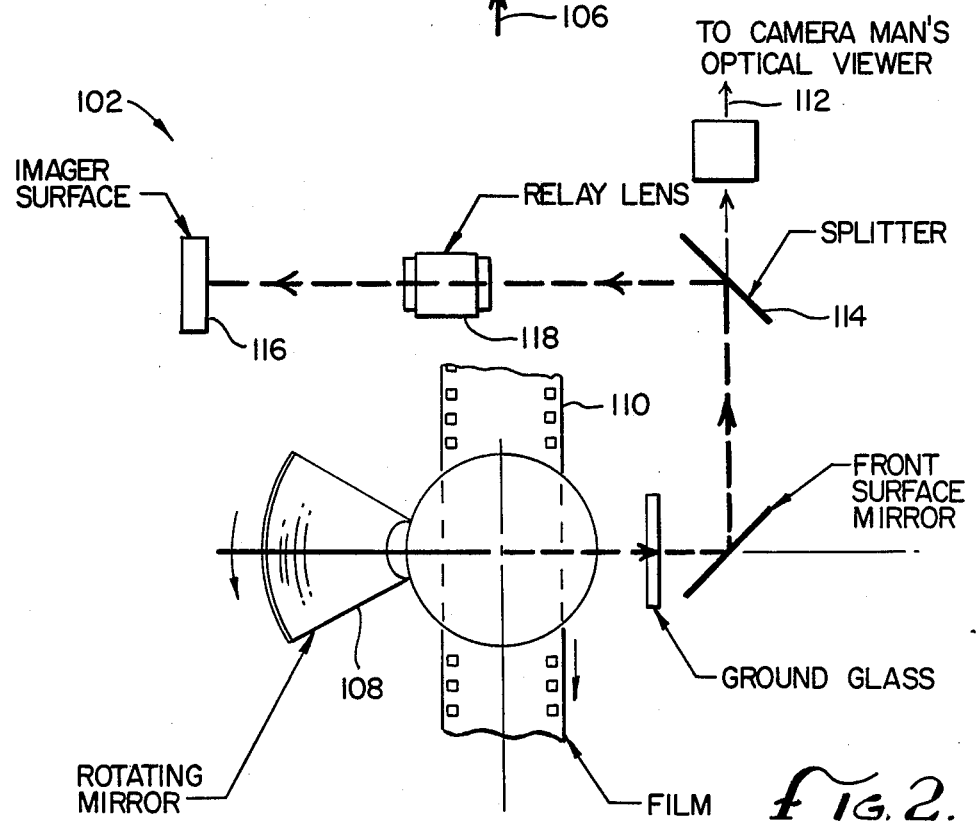
FIG. 2 is a front elevation view of an illustration of the motion-picture camera and video assist system of FIG. 1.

FIGS. 1-2 are illustrations of a motion-picture camera which incorporates the video assist system of the present invention. A motion-picture camera 102 has a lens 104 through which light 106 from a subject (not shown) passes. A rotating mirror 108, which may comprise a conventional butterfly-shaped mirror, divides the time during which an image is captured by the lens 104 into two parts, one part during which film is exposed and another part during which film is not exposed, as is well known in the art. The rotating mirror 108 may direct the light 106 to film 110 during film exposure and to an operator's optical viewer 112 during non-exposure. In a preferred embodiment, the light directed to optical viewer 112 may be split with a beam splitter 114 to direct a part of that light to an imager surface 116 of a video assist circuit. A relay lens 118 may also be used to focus on the imager surface 116 that portion of the light 106 which is directed to the video assist circuit.

Before describing the details of the video assist circuit, a general description of its operation is informative. The video assist circuit records periodic frames of the motion-picture image using a solid state image device such as a CCD storage device. A CCD storage device operates extremely quickly relative to the motion-picture capture rate; it may transfer each recorded frame to a storage register before the next frame is exposed. An automatic gain control ("AGC") amplifier is provided for automatically adjusting the signal gain of the transmitted image and for automatically adjusting the iris opening of the relay lens 118, resulting in automatic control of image brightness. Each recorded frame is stored into a frame buffer, one scan line at a time, and may be read from the frame buffer at a standard television ("TV") signal rate. The frame buffer is also made capable of holding a "frozen" frame, for comparison with an externally generated image and for later reconstruction of a camera scene in a continued film sequence.

Figure 3:
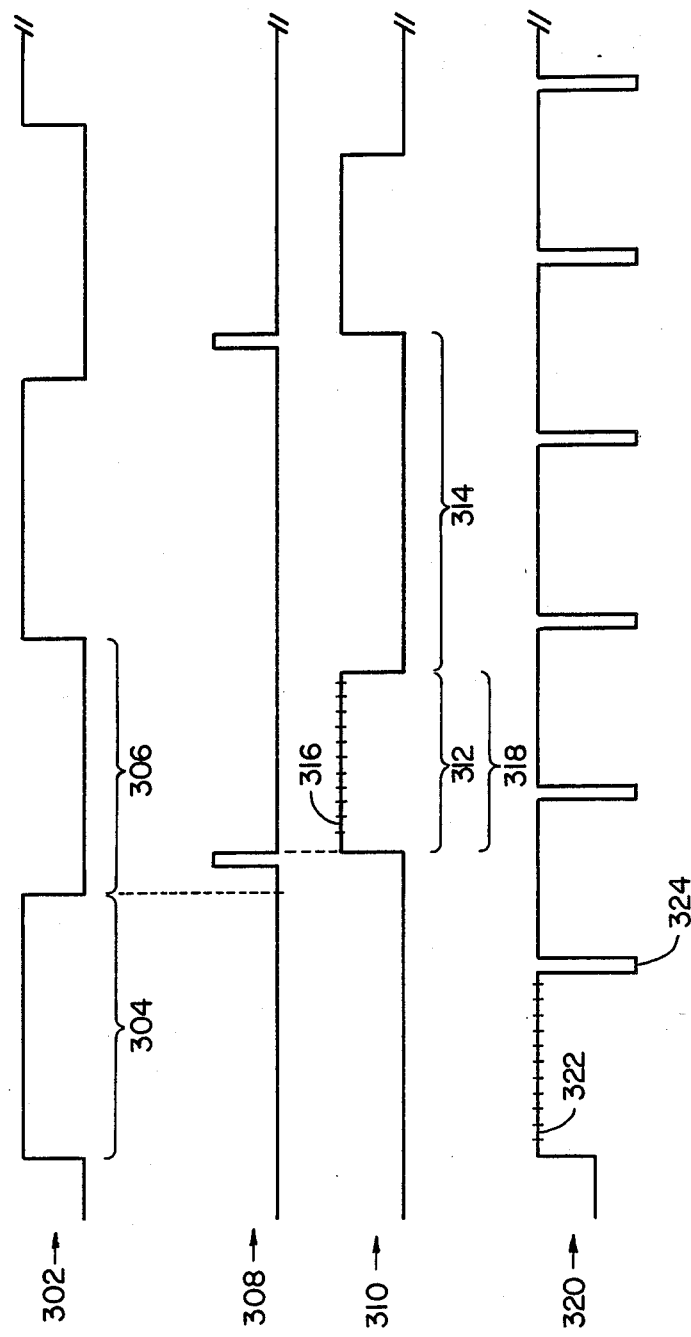
FIG. 3 is a timing diagram of several signals in use in the video assist circuit.

FIG. 3 is a timing diagram of several activities of the video assist circuit. The video assist circuit operates in conjunction with a motion-picture camera 102 whose image capture rate may comprise about 24 frames/sec. Signal 302 indicates a division of time into film exposure time 304 and non-exposure time 306. Signal 308 indicates transfer time of each recorded frame stored in the CCD storage device.

Signal 310 indicates a transfer of each recorded frame from the storage register to the frame buffer, and indicates a division of this signal 310 into transfer time 312 and non-transfer time 314. Each scan line 316 in the transfer time 312 is transmitted at a TV scan rate of about 15 KHz, but each frame 318 is transmitted at the motion-picture capture rate of about 24 Hz. Signal 310 shows non-continuous transfer of data; nontransfer time between frames exists where no pixels are transmitted.

Signal 320 indicates a TV signal output from the frame buffer, and indicates that each scan line is transmitted at a TV scan rate of about 15 KHz, and that frames are also transmitted at a TV frame rate of about 60 Hz. Signal 320 shows continuous transfer of data, as well as vertical sync pulses 324.

Figure 4:
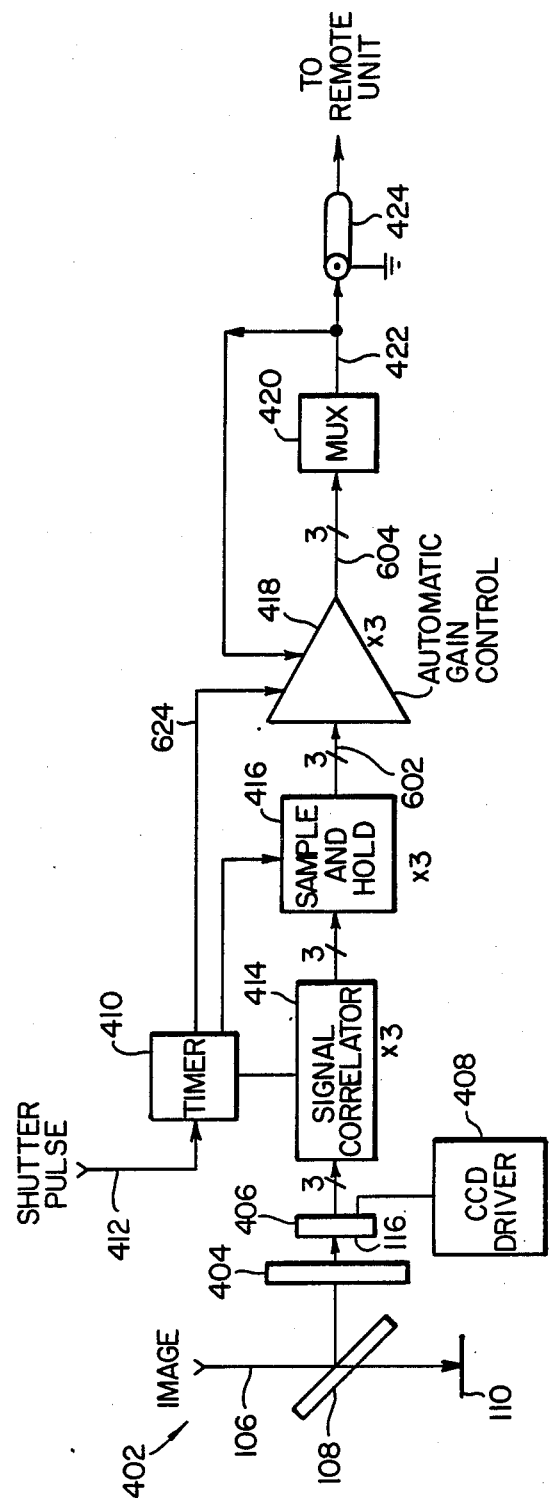
FIG. 4 is a block diagram of the camera mounted portion of the video assist circuit of the present invention.
Figure 5:
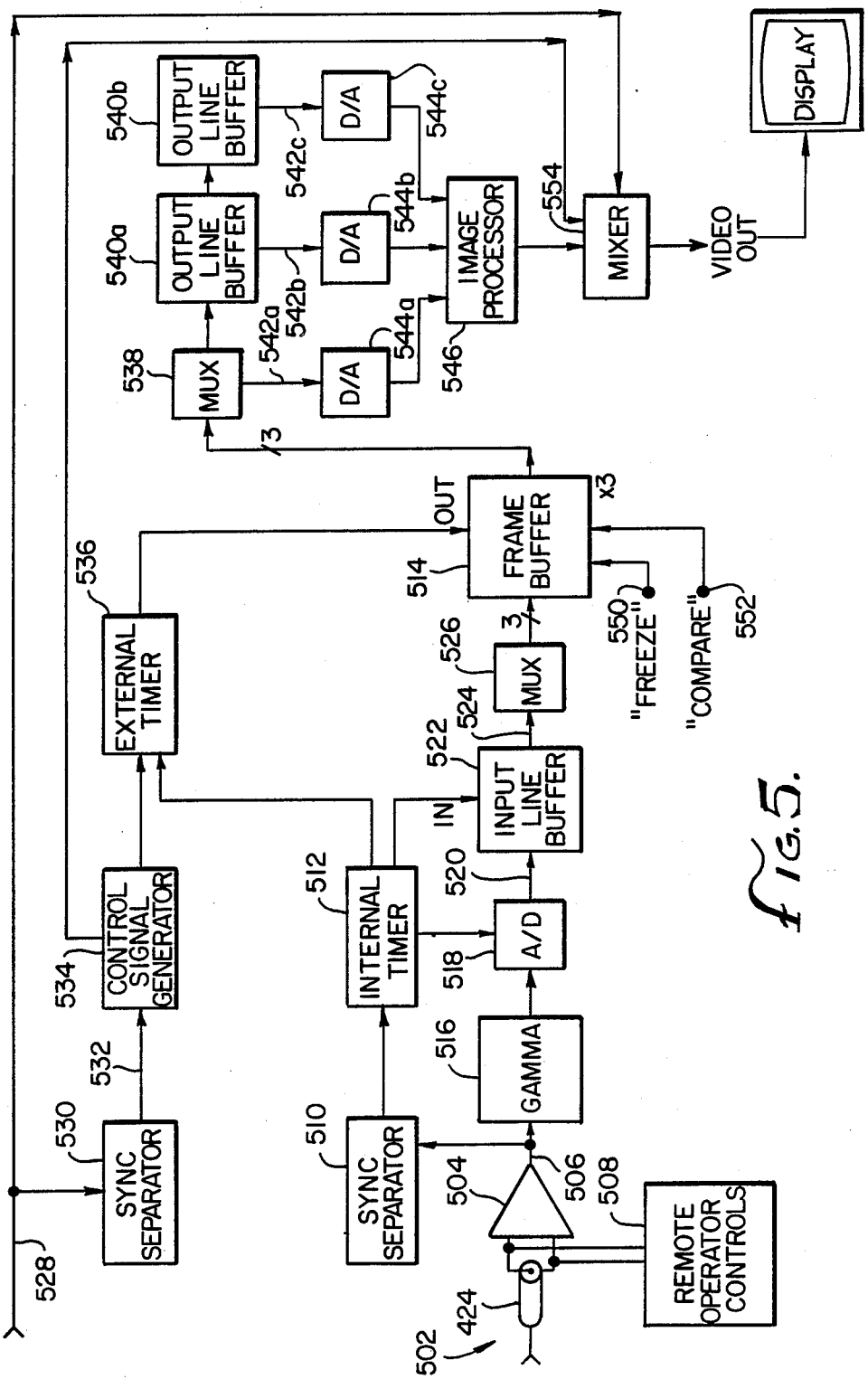
FIG. 5 is a block diagram of the remote unit portion of the video assist circuit of the present invention.

FIG. 4 is a block diagram of a camera unit 402 of the video assist circuit, and FIG. 5 is a block diagram of the remote unit 502 of the video assist circuit, collectively referred to herein as the video assist circuit. As described above, input light 106 strikes a rotating mirror 108, which directs the light 106 either to film 110 or to an optical path that includes an imager surface 116 of the video assist circuit. The light passes through an iris 404 which regulates the input of the light 106 to an imager surface 116 which comprises a charge-coupled storage device ("CCD") 406.

In an embodiment of the video assist system allowing imaging of color information, cells of CCD 406 may be masked by color filters to generate separate channels of color filtered image data. In a preferred embodiment, three channels (which may comprise red, green and blue) of image data may be generated and separately processed by triplets of certain components and signal lines of the video assist circuit. Triplets of an element are indicated in the figures by the symbol "x3" near the drawing of that element; triplets of signal lines are indicated in a standard manner. Each element of a triplet processes or propagates one channel of color image data.

CCD 406 is exposed to light 106 and accumulates stored charge in each cell in proportion to the amount of light 106 which falls on that cell, forming an image on CCD 406. In a preferred embodiment, CCD 406 may comprise a rectilinear array of 754 by 488 cells, with 720 by 488 cells available for image accumulation and the remainder reserved as reference cells, or another granularity which is common in the art. In a preferred embodiment, CCD 406 may comprise a Texas Instruments ("T.I.") CCD device, part number 2C240. The data sheet for the T.I. 2C240 (available from T.I.) explains the characteristics, operation and use of that part, and is hereby incorporated by reference.

CCD 406 is controlled by a CCD driver 408, as is well known in the art. In a preferred embodiment, CCD driver 408 may comprise a T.I. CCD driver chip set, including a P-driver device, part number TMS 3473, an S-driver device, part number TMS 3472, a timing generator, part number TMS 3471, and a sample and hold device, part number TL 1593. Preliminary data sheets on these parts are available from T.I. which explain the characteristics, operation and use of these parts, and are hereby incorporated by reference.

In a preferred embodiment, cells of CCD 406 may be arranged with a contiguous group of cells forming an exposed area, with a second contiguous group of cells forming a storage register, as is well known in the art. In an alternate embodiment, cells of CCD 406 may be arranged with exposed area interlaced in alternating lines with cells which form a storage register.

A timer 410 is operatively connected to a signal line 412, which carries a shutter pulse signal which indicates each shutter pass of the rotating mirror 108, as is well known in the art. The shutter pulse signal may be generated by a shutter pass detector (not shown) disposed near the rotating mirror 108, as is well known in the art. In a preferred embodiment, the shutter pass detector may comprise an LED and photoreceptor pair, disposed so as to detect each rotation of the rotating mirror 108 by interruption of a light beam, as is well known in the art.

Timer 410 is triggered by the shutter pulse signal on line 412, and generates a timing signal which is delayed to match a non-exposure period of CCD 406 and to match a television horizontal synchronization ("sync") signal of about 15 KHz. In a preferred embodiment, timer 410 may comprise the timing generator of the T.I. CCD driver chip set identified above, plus circuitry to delay a timing signal from that chip to match a non-exposure period of CCD 406. Matching a non-exposure period of CCD 406 is preferred, but is not required for operation of the video assist system.

In a preferred embodiment, timer 410 may have two modes of operation, a first "one-shot" mode of operation in which timer 410 generates a single set of timing signals per trigger, and a second "continuous" mode of operation in which timer 410 generates a periodic set of timing signals from a first trigger. In a first mode of operation for the video assist circuit, timer 410 is triggered by the shutter pulse signal and operates in the one-shot mode of operation, as described above. In a second ("open-shutter") mode of operation, the shutter of the motion-picture camera 102 is left open and timer 410 operates in the continuous mode. In a preferred embodiment, automatic switchover to the open-shutter mode of operation occurs when a shutter speed of the motion-picture camera 102 is 4 frames/sec or less.

As a result of delaying the timing signal to match a non-exposure period, timer 410 is triggered once per captured frame when the motion-picture camera 102 is capturing frames at a capture rate of less than the television standard transmission rate of 60 Hz. When the motion-picture capture rate exceeds 60 Hz, timer 410 is triggered less often, i.e. once per two captured frames, once per three captured frames, and so on until the image captured by CCD 406 is virtually indistinguishable from the image which would be captured if the shutter were left continuously open.

Timer 410 provides a clock signal for a signal correlator circuit 414. Signal correlator circuit 414 removes low frequency noise commonly observed at the output of CCD storage devices (also known in the art as "on-chip 1/f noise"). In a preferred embodiment, signal correlator circuit 414 operates by subtracting pixel data retrieved from CCD 406 in a pulse amplitude modulated format from reference pixel signals retrieved from CCD 406 between pulses, as is well known in the art. Use of signal correlator circuit 414 is preferred, but is not required for operation of the video assist system.

After exposure of CCD 406, and after a transfer/storage time lasting about 300–350 microseconds with present technology CCD devices, the contents of CCD 406 are transferred (via signal correlator circuit 414) to a sample and hold circuit 416, thus converting image data from a pulse amplitude modulated format to a continuous analog level format, as is well known in the art.

Image data is then amplified by an automatic gain control ("AGC") amplifier 418, which automatically amplifies the brightness of the image to a desired level. Amplifier 418 inputs image data on line 602 from sample and hold register 416, and outputs an amplified image signal on line 604. Amplifier 418 is more fully disclosed with reference to FIG. 6.

Multiplexor 420 multiplexes the three color channel signals into a single image signal on line 422. The image signal on line 422 is transmitted via cable 424 to a remote unit 502 (shown in FIG. 5) of the video assist circuit. In a preferred embodiment, additional signals such as horizontal sync and vertical sync signals may be transmitted on cable 424 from the camera unit 402 to the remote unit 502, or from the remote unit 502 to the camera unit 402.

FIG. 5 is a block diagram of the remote unit of the video assist circuit of the present invention. Remote unit 502 may comprise a differential line receiver 504 which receives the image signal on cable 424 and which removes any induced line noise, as is well known in the art, to produce an image signal on line 506.

Remote unit 502 may comprise remote operator controls 508, operatively connected to cable 424, for transmitting operator commands from an operator located near remote unit 502 to AGC amplifier 418. Feedback controller 624 (shown in FIG. 6) may accept operator commands from remote operator controls 508 or from operator controls 606 (shown in FIG. 6) located in camera unit 402, but remote operator controls 508 include a control for directing which set of controls feedback controller 624 responds to. In a preferred embodiment, operator controls may comprise an "automatic/manual" control for determining if the AGC amplifier 418 will operate automatically or solely in response to operator brightness commands, and "up" and "down" controls for directing that image brightness be increased or decreased, respectively.

A sync separator circuit 510 separates synchronization ("sync") information from the image signal on line 506 and transmits that sync information to internal timer circuit 512. Internal timer 512 generates clock signals for control of input to the frame buffer 514. Sync signals may be transmitted on cable 424 by sync generator circuitry in the camera unit 402, as is well known in the art, and may comprise a horizontal sync signal with a frequency of about 15 KHz and a vertical sync signal with a frequency of about 24 Hz. In a preferred embodiment, sync separator 510 may comprise a standard sync separator circuit controlling a crystal controlled phase-locked loop timing generator, as is well known in the art.

In a preferred embodiment, the image signal on line 506 may comprise a sequence of pixels transmitted at a frequency of about 14,318,180 Hz, as is well known in the art to be a standard video image data transmission rate. The image signal on line 506 is adjusted by gamma circuit 516 to reduce brightness distortion by inverting any distortion caused by the display device (i.e. by stretching grey levels near black and by squeezing grey levels near white), as is well known in the art. Gamma adjustment is preferred but is not required for operation of the video assist system.

An A/D 518 digitizes the resultant signal to produce a set of digitized pixels on line 520. Digitized pixels on line 520 are stored in an input line buffer 522, which stores one horizontal scan line of pixels. Digitized pixels are retrieved from input line buffer 522 and propagated on line 524, as is well known in the art. It may occur that there are an odd number of reflecting means in the motion-picture camera used in conjunction with the video assist system. As is well known in the art, an odd number of reflecting means will produce an image which is reversed. Reversed images are re-reversed by retrieving digitized pixels from input line buffer 522 last-in first-out ("LIFO"), rather than first-in first-out ("FIFO").

A frame input multiplexor 526 distributes digital pixels into triplet frame buffer 514, as is well known in the art. In a preferred embodiment, each channel of color image data is stored separately in frame buffer 514; however, in an alternate embodiment, RGB color information may be converted to NTSC or to any other representation after storage in frame buffer 514. Digital pixels are stored in frame buffer 514 under control of a signal generated by external timer 536, as is well known in the art. Frame buffer 514 stores one complete frame of digitized pixels.

An external video signal on line 528 is directed to a sync separator circuit 530, which separates sync information from the video signal on line 532 and transmits that sync information to control signal generator 534 and external timer circuit 536, which generate external clock signals for control of output from frame buffer 514.

A frame output multiplexor 538 combines digital pixels from triplet frame buffer 514 into a single stream, as is well known in the art. A pair of output line buffers 540a-b record two horizontal scan lines previous to the pixel presently output from frame buffer 514. Thus, pixels output on lines 542a-c respectively are separated by exactly one horizontal scan line, as is well known in the art.

A set of D/As 544a-c convert digital pixels to analog format and propagate their results to an image processor circuit 546. Image processor 546 combines the image line and the two delayed image lines to produce a video output signal on line 548. The pixel generated by image processor 546 is formed by adding the middle scan line pixel to a multiple of the average of the surrounding scan line pixels, e.g. using the equation:

center = center + (k * ($\frac{1}{2}$) * (top + bottom)), where k is a constant parameter. Choice of k which is negative produces a modified video image in which edge transitions are enhanced; choice of k which is positive produces a modified video image in which edge transitions are subdued; choice of k which is zero produces an unmodified video image.

Because frame buffer 514 is written into concurrently with being read out of, it is desired that the address at which writing occurs (the "writing locus") should not ever cross over the address at which reading occurs (the "reading locus"). Such a cross over would tend to generate a discontinuity in the output image. The use of input line buffer 522, which buffers up to two complete horizontal scan lines of input data prior to input into frame buffer 514, suffices to prevent such a discontinuity unless the internal sync signal is wildly different (about 1%) from the external sync signal.

A "freeze" control 550 is operatively connected to frame buffer 514 for directing frame buffer 514 not to accept further inputs which change the image, thus freezing the image which is ultimately displayed. When freeze control 550 is used, an operator may examine the video output signal on line 548 at his or her convenience.

A "compare" control 552 is operatively connected to frame buffer 514 for directing frame buffer 514 to compare the camera image input with a camera image stored in frame buffer 514 or input from the external video signal on line 528. Compare control 552 is also operatively connected to external timer 536 and directs external timer 536 to operate in synchrony with internal timer 512. When compare control 552 is used, mixer 554 alternately displays the external video signal on line 538 and the video output signal on line 548, producing a "blinking" image effect which overlays the reference (external) video signal with the input (camera) video signal. Compare control 552 may be used to reset a scene from a stored image from frame buffer 514 or from a videotape (not shown), so that all of the objects and persons in a scene may be placed in nearly identical locations and positions for further filming.

Line buffer 522 may also be used to provide time base correction for a relatively unsynchronized external video signal. As is well known in the art, certain devices may supply an external video signal which is relatively unsynchronized with a precision TV signal. In a preferred embodiment, line buffer 522 may be operatively connected to an external video signal such as a video signal from a consumer video tape recorder ("VCR") and may operate in conjunction with a horizontal sync pulse from that VCR, while readout of line buffer 522 may operate in conjunction with internal timer 512. By this means, even a video signal from a relatively unsynchronized external video signal, such as that from a VCR, may be compared with a input signal from the motion-picture camera 102.

FIG. 6 shows a block diagram of the automatic gain control ("AGC") amplifier 418. Amplifier 418 is operatively connected to line 602 for receiving image data from sample and hold register 416, to operator controls 606 for receiving operator brightness commands, to a reference signal 608 for measuring and adjusting the brightness of the image, to iris motor control 610 for adjusting the iris opening of the motion-picture camera 102, to iris motor feedback 612 for determining if the iris 404 is fully open, and to line 604 for output of an amplified image signal.

A multiplier 614 receives a signal on line 602, amplifies that signal by a factor represented by a gain signal on line 634, and transmits that amplified signal on line 604. A signal on line 422 from the output of multiplexor 420 is input to a weighted peak detector 620, which generates a white level signal on line 622 under control of a frame reset signal on line 624, as is well known in the art. The frame reset signal on line 624 signals the weighted peak detector 620 to discharge its internal capacitor, thus clearing its memory for making a new weighted peak determination for a new frame, as is well known in the art. In a preferred embodiment, the white level signal on line 622 is a pulse amplitude modulated format at a frequency of about 24 Hz. In a preferred embodiment, the frame reset signal on line 624 may be generated by timer 410. The white level signal on line 622 is transmitted to feedback controller 624, along with operator brightness commands from operator controls 606, and a reference signal 608.

Feedback controller 624, operating in conjunction with feedback memory 626, determines whether to adjust the brightness up or down. Feedback controller 624 generates a gain signal on line 616, thus adjusting the gain of multiplier 614, or directs iris motor control 610 to adjust the opening of iris 404. The signal to iris motor control 610 may adjust the iris 404 either further open or further closed. Iris motor feedback 612 signals when the iris 404 is already fully open and when signalled, cuts off further direction to the iris motor (not shown) to open the iris 404.

In a preferred embodiment, feedback controller 624 may comprise a programmed logic array implementing a simple plan of action. It is preferred to open iris 404 to the fullest, so as to maximize the signal/noise ratio of image data generated by CCD 406. It is also preferred to make later adjustments to the gain signal on line 616, rather than to the iris 404, as adjustments on line 616 may be made more quickly. Accordingly, feedback controller 624 operates to adjust iris 404 first when an upward adjustment in brightness is desired (until iris 404 is fully open), and to adjust line 616 first when a downward adjustment in brightness is desired (until line 616 represents a factor of almost zero).

Feedback controller 624 could also comprise a microprocessor operating under program control, a custom circuit, or other control techniques well known in the art. It would be clear from this description for one of ordinary skill in the art to modify well known programmed logic arrays, or other control circuitry, to implement the plan of action for brightness control described hereinabove.

In a preferred embodiment, multiplier 614 comprises one multiplier circuit 614 for each color channel. The gain signal on line 616 is propagated to pulse generator 628, which generates a triplet of pulses on line 630. In a preferred embodiment, the signal on line 630 has a pulse amplitude modulated format at a frequency of about 7.85 KHz (corresponding to a pulse each two scan lines). Each pulse is propagated to a summing junction 636, for addition to the image scan line in a horizontal blanking interval. Secondary gain control 632 adjusts the gain signal on line 634 and thus adjusts the amplification of multiplier 614 for each color channel to conform with a predetermined desired brightness, by means of feedback techniques which are well known in the art.

While a preferred embodiment is disclosed herein, many variations are possible which remain within the scope of the invention, and these variations would become clear to one skilled in the art after a perusal of the specification, drawings and claims herein.

I claim:

1. A video assist system for use in conjunction with a motion-picture camera having a predetermined capture rate for a motion-picture image, said system comprising
memory means for recording infalling light in synchrony with said motion-picture camera as a plurality of periodic image frames at said predetermined means for retrieving a plurality of said periodic image frames from said memory means at a periodic rate which is independent of said capture rate.

2. A video assist system as in claim 1, wherein said means for retrieving comprises means for translating data from said memory means into an intermediate signal format having a line transmission rate and a frame transmission rate substantially independent of said line transmission rate.

3. A video assist system as in claim 1, wherein said means for retrieving comprises means for translating data from said memory means into an intermediate signal format having periodic frames and lines within said periodic frames, said intermediate signal format comprising a frame transmission rate substantially greater than the inverse of a frame transmission time.

4. A video assist system as in claim 3, wherein said line transmission rate is substantially equal to a television standard line transmission rate, and wherein said frame transmission rate is substantially equal to a predetermined motion-picture file capture rate.

5. A video assist system as in claim 1, wherein said means for retrieving comprises means for translating data from said memory means into an intermediate signal format having periodic frames and lines within said periodic frames, said intermediate signal format comprising
    line format means comprising a line transmission rate; and
    frame format means comprising a plurality of said line format means within a frame transmission time, and further comprising non-transmission format means comprising a substantial absence of said line format means.

6. A video assist system as in claim 1, wherein said memory means comprises CCD means for receiving infalling light and for generating image data therefrom.

7. A video assist system as in claim 1, wherein said predetermined capture rate is set by an operator of said motion-picture camera.

8. A video assist system for use in conjunction with a motion-picture camera having a predetermined capture rate for a motion-picture image, said system comprising
    memory means for recording infalling light in synchrony with said motion-picture camera as a plurality of periodic image frames at said predetermined capture rate; and
    means for retrieving a plurality of said periodic image frames from memory means with a line retrieval rate which is independent of said capture rate and with a frame retrieval rate which is an integer multiple of said capture rate.

9. A video assist system as in claim 8, wherein said predetermined capture rate is set by an operator of said motion-picture camera.

10. A video assist system for use in conjunction with a motion-picture camera having a predetermined capture rate for a motion-picture image, said system comprising
    memory means for recording periodic frames of said motion-picture image;
    means for translating data from said memory means into an intermediate signal format having a line transmission rate and a frame transmission rate substantially independent of said line transmission rate; and
    means for converting said intermediate signal format into a standard television signal format.

11. A video assist system as in claim 10, wherein said line transmission rate corresponds to a predetermined output rate of said memory means.

12. A video assist system as in claim 11, wherein said frame transmission rate corresponds to a standard television signal format frame transmission rate.

13. A video assist system as in claim 10, wherein said means for converting comprises a line buffer for storing image data corresponding to said intermediate signal format.

14. A video assist system as in claim 13, wherein said line buffer comprises
    means for synchronizing an input to said line buffer with a first horizontal sync signal from an external video signal source; and
    means for synchronizing an output from said line buffer with a second horizontal sync signal.

15. A video assist system as in claim 10, wherein said means for converting comprises a frame buffer for storing image data corresponding to said intermediate signal format.

16. A video assist system as in claim 10, comprising means for receiving said intermediate signal format and for storing image data corresponding to said intermediate signal format.

17. A video assist system for use in conjunction with a motion-picture camera having a predetermined capture rate for a motion-picture image, said system comprising
    means for recording a first image of a past scene;
    means for capturing a second image of a present scene; and
    means for displaying said first and second images in conjunction, whereby said first and second images may be directly compared.

18. A video assist system for use in conjunction with a motion-picture camera having a predetermined capture rate for a motion-picture image, said system comprising
    memory means for recording a scan line of image pixels corresponding to at least part of an image pointed to by said motion-picture camera in a predetermined order; and
    means for retrieving said scan line in reverse order from said predetermined order.

19. A video assist system for use in conjunction with a motion-picture camera having a predetermined capture rate for a motion-picture image, said system comprising
    means for synchronizing an input to a line buffer with a first horizontal sync signal from an external video signal source corresponding to at least part of an image pointed to by said motion-picture camera; and
    means for synchronizing an output from said line buffer with a second horizontal sync signal.

20. A video assist system for use in conjunction with a motion-picture camera having a predetermined capture rate for a motion-picture image, said system comprising
    means for periodically converting image frames, corresponding to at least part of an image pointed to by said motion-picture camera, into image data;
    memory means for storing said image data;
    means for amplifying said image data to a predetermined brightness; and means for retrieving said image data in a television signal format.

21. A video assist system for use in conjunction with a motion-picture camera having a predetermined capture rate for a motion-picture image, said system comprising means for measuring infalling light, corresponding to at least part of an image pointed to by said motion-picture camera, at a plurality of image points and for generating image data therefrom;
means for storing said image data;
means for automatically amplifying said image data to a predetermined brightness;
frame buffer means for recording said image data;
means for retrieving said image data from said frame buffer means, and for generating therefrom a signal substantially in a television signal format.

22. A video assist system for use in conjunction with a motion-picture camera having a predetermined capture rate for a motion-picture image, said system comprising CCD means for receiving infalling light, corresponding to at least part of an image pointed to by said motion-picture camera, and for generating image data therefrom;
automatic gain control means for automatically amplifying said image data to a predetermined brightness;
line buffer means for recording at least one horizontal scan line of said image data;
frame buffer means for recording at least one frame of said image data;
means for retrieving said image data from said frame buffer means, and for generating therefrom a signal substantially in a television signal format.

23. A method of operating a video assist system in conjunction with a motion-picture camera having a predetermined capture rate for a motion-picture image, comprising the steps of recording infalling light in synchrony with said motion-picture camera as a plurality of periodic image frames in memory means at said predetermined capture rate; and
retrieving a plurality of said periodic image frames from memory means at a periodic rate which is independent of said capture rate.

24. A method as in claim 23, wherein said predetermined capture rate is set by an operator of said motion-picture camera.

25. A method of operating a video assist system in conjunction with a motion-picture camera having a predetermined capture rate for a motion-picture image, comprising the steps of recording infalling light in synchrony with said motion-picture camera as a plurality of periodic image frames in memory means at said predetermined capture rate; and
retrieving a plurality of said periodic image frames from memory means with a pixel retrieval rate which is independent of said capture rate and with a frame retrieval rate which is an integer multiple of said capture rate.

26. A method as in claim 25, wherein said predetermined capture rate is set by an operator of said motion-picture camera.

27. A method of operating a video assist system in conjunction with a motion-picture camera having a predetermined capture rate for a motion-picture image, comprising the steps of recording periodic frames of said motion-picture image in memory means;
translating data from said memory means into an intermediate signal format having a line transmission rate and a frame transmission rate substantially independent of said line transmission rate; and
converting and intermediate signal format into a standard television signal format.

28. A method of operating a video assist system in conjunction with a motion-picture camera having a predetermined capture rate for a motion-picture image, comprising the steps of recording a first image of a past scene;
capturing a second image of a present scene; and
displaying said first and second images in conjunction; wherein said first and second images may be directly compared.

29. A method as in claim 28, comprising the step of altering said present scene until said first and second images are substantially identical.

30. A method of operating a video assist system in conjunction with a motion-picture camera having a predetermined capture rate for a motion-picture image, comprising the steps of recording a horizontal scan line of image pixels in memory means in a predetermined order; and
retrieving said horizontal scan line in reverse order from said predetermined order.

31. A method of operating a video assist system in conjunction with a motion-picture camera having a predetermined capture rate for a motion-picture image, comprising the steps of synchronizing an input to a line buffer with a first horizontal sync signal from an external video signal source; and
synchronizing an output from said line buffer with a second horizontal sync signal.

32. A video assist system for generating a flicker-free image corresponding to at least part of an image pointed to by a motion picture camera having a film shutter operating in a periodic cycle at a predetermined rate, said system comprising means for generating a shutter pulse signal each time said film shutter of said motion-picture camera reaches a predetermined point in said periodic cycle, the timing of said film shutter not being controlled by the video assist system;
means, coupled to said means for generating, for generating a frame of image data for each said shutter pulse signal;
means for storing said frame of image data in a memory;
means for retrieving said image data from said memory in a continuous sequence at a periodic rate which is independent of said rate.

33. A video assist system as in claim 32, wherein said predetermined rate is set by an operator of said motion-picture camera.

34. A video assist system as in claim 32, wherein said means for generating comprises a CCD.

35. A video assist system as in claim 32, wherein said memory comprises a dual-port memory.

36. A video assist system as in claim 32, wherein said means for storing and said means for retrieving operate substantially simultaneously, whereby said image data which is retrieved from said memory substantially corresponds to said image pointed to by said motion-picture camera.

37. A video assist system as in claim 32, comprising means for generating a television signal from said image data which is retrieved from said memory.

* * * * *